United States Patent Office 3,039,376
Patented June 19, 1962

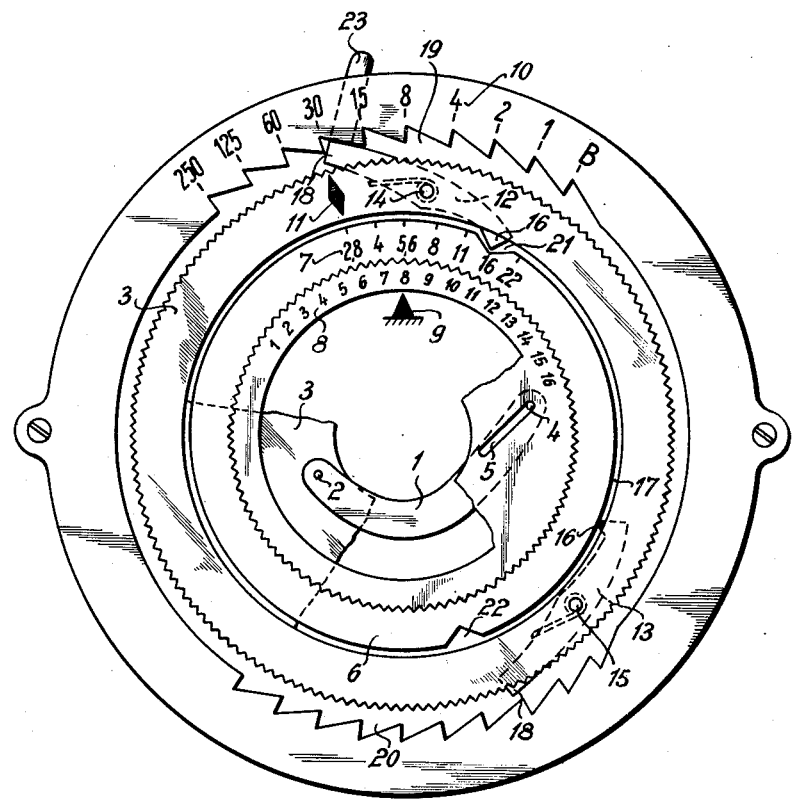

3,039,376
PHOTOGRAPHIC CAMERA PROVIDED WITH MEANS FOR ADJUSTMENT OF THE LIGHT VALUE
Richard Sommer, Braunschweig, Germany, assignor to Voigtlander A.G., Braunschweig, Germany, a corporation of Germany
Filed Jan. 30, 1958, Ser. No. 712,177
Claims priority, application Germany Feb. 2, 1957
13 Claims. (Cl. 95—64)

This invention relates to photographic cameras provided with means for adjustment of light values and it has particular relation to cameras of the type disclosed and claimed in the co-pending application filed in the name of Wietse Hendrik van der Mei under Ser. No. 520,001 on July 5, 1955 for "Photographic Camera."

In said co-pending application Ser. No. 520,001, a photographic camera and a shutter, particularly a central shutter, are described, in which the diaphragm lamellae are under the influence of two adjusting organs, one of which, as a diaphragm ring, introduces the light value measured for the picture to be taken, and the other introduces the desired time value corresponding to the illumination, with consideration of the corresponding adjustment of the diaphragm. The advantages of such an arrangement are evident particularly in cameras provided with a coupled exposure meter, in which the elements on the shutter for adjustment of the exposure conditions and the indication of the exposure meter are mechanically connected with each other, for example over an adjusting pointer. The measuring device is thereby preferably a restoring instrument or a follow up pointer instrument and arranged in such a manner that the adjusting members of the exposure meter, which are to follow up the measuring pointer, are connected over a simple gearing with the member for adjustment of the light value.

In order to render available the setting of all light values which correspond to the number of time values and diaphragm values provided for, in the device described in said copending application Ser. No. 520,001, the diaphragm adjusting member can be turned through an angular range which corresponds to the sum of the angular ranges of diaphragm scale and time scale. If, for example, with the aid of the exposure meter indication the correct light or exposure value has been adjusted by turning the diaphragm and adjusting member, then within the diaphragm range, or within a residual diaphragm range corresponding to the measured light value, a definite exposure time or a definite diaphragm opening can be selected. In such selection, the time adjusting member which is in connection with the diaphragm lamellae, is turned. During this adjustment it may easily happen that the operator, who may have fully concentrated his attention on the object to be photographed, inadvertently displaces the time adjusting member beyond the residual diaphragm range determined by the adjusted light value and thereby—over the connection of the diaphragm lamellae or over other coupling members between the adjusting means—causes turning of the diaphragm ring too, so that the exposure or light value is changed. The operator will then act on the assumption that the previously correctly adjusted light value still applies, but his exposure will be defective, because the originally correct adjustment has been inadvertently changed by movement of the time adjusting member.

One of the main objects of the present invention is to eliminate this defect. This is attained according to the present invention by arranging locking means acting between the diaphragm adjusting member and the time adjusting member, said locking means being adapted to prevent turning of the time adjusting member beyond the residual diaphragm range determined by adjustment of the light value in the respective case. In carrying out this arrangement of the invention, it is in principle irrelevant whether the locking means used consist of cams, pins, one-armed or two-armed levers, or the like. Furthermore, the locking means can be applied as individual members, or in pairs, whereby, however, it should be taken into consideration that locking should safely occur in both directions of displacement of the time adjusting member, upon reaching the diaphragm end position, in the respective case.

In carrying out the present invention, it is preferred to use as locking means, spring-loaded locking levers which are pivotally mounted on the time adjusting member and are controlled by the diaphragm adjusting member in such a manner that they fall into stationary locking grooves upon reaching end positions of the diaphragm. Thereby, a separate locking lever can be provided for each diaphragm end position, or the arrangement can be such that a single locking lever locks the time adjusting member in both end positions of the diaphragm.

Control by the diaphragm adjusting member is brought about, in the case of two-armed locking levers, preferably in such a manner that within the free range of diaphragm adjustment, one arm of each of the locking levers slides on the periphery of the diaphragm adjusting member and the levers exert no locking effect, until one of the sliding lever arms sinks in one of two recesses suitably provided on the diaphragm adjusting member, the result of this being that, upon reaching one of the diaphragm end positions, the other arm of the corresponding lever falls into a stationary recess and exerts its locking action. In the use of one-armed locking levers, controlling can be brought about through the diaphragm adjusting member, for example, by means of cams suitably arranged on said member, whereby upon adjustment of one of the diaphragm end values the cams press one of the locking levers to locking position. In a manner similar to that used in the case of two-armed levers, both locking positions can be attended to by only one one-armed locking lever.

In the use of two-armed locking levers, recesses in the diaphragm adjusting member are formed, according to the present invention, in such a manner that any actuation of the diaphragm adjusting member causes lifting of the locking members from the recesses so that the locking device is inactivated.

Instead of providing recesses in the diaphragm adjusting member, for the same functions, cams, pins or the like can be likewise used, for example in connection with a one-armed locking lever.

If adjustments of the light value are carried out over the diaphragm adjusting member by means of a built-in exposure meter, for example by means of a follow up pointer, then the arrangement of a light value scale could be dispensed with. However, for reasons of checking it may be desirable to read the adjusted light value and for this purpose a light value scale and a corresponding reading mark can be arranged at a suitable point.

It is contemplated according to the present invention to arrange the light value scale opposite to a stationary mark, on the diaphragm adjusting member, or to arrange the scale and mark in reversed position.

The arrangement of the adjusting members which act on the two diaphragm control rings, can be different, depending on the construction of the objective and the shutter. For example, if the diaphragm is arranged near the shutter lamella, e.g. in exchangeable objectives in which only the front members are exchanged, it is of advantage to couple the diaphragm control ring turned toward the camera casing with the member for adjusting the light value. The advantage of such arrangement consists in that the member for adjustment of the light value can be mounted with a short connection to the diaphragm control ring close to the camera casing. In arrangements with a coupled exposure meter, this has the advantage that the connection from the exposure meter to this adjusting member can be likewise kept rather short.

If, however, the present invention is used in cameras of the type with which exchangeable objectives are removed and inserted as a whole, the diaphragm is usually located in the objective, while the shutter is fixedly built-in the camera. In such cases, it is contemplated according to the present invention to couple the diaphragm control ring turned toward the camera casing with the time adjusting member, by means of which—within a predetermined light value—the various time-diaphragm combinations desired in individual cases of picture taking are selected.

The diaphragm scale and time scale are preferably arranged in such a manner that a single mark is arranged opposite the two scales. Such mark can be stationary, whereby both scales are rotatable, or the mark and one of the two scales—preferably the diaphragm scale—can be rotatable.

As explained above, the locking means embodying the invention, and acting between the time adjusting member and the diaphragm adjusting member, are designed to prevent an inadvertent change of the light value setting while adjusting to a definite diaphragm value or a definite time value within a previously adjusted light value. However, in certain special instances, such as in the making of certain trick pictures, exposure condition settings which do not correspond to the correct light value may be used deliberately. To provide for such special instances, the locking means embodying the present invention is designed in such a manner that they can be put out of operation from the outside, for example by a handle provided for this purpose. In such an embodiment the locking lever arms can, for example, carry a lug, projection, or the like which passes, for example, through a slot in the camera casing and projects from the latter and prevents the respective lever arm from locking, when said lug is depressed.

For the sake of easier understanding, the invention of the beforementioned co-pending patent application Serial No. 520,001 was described in said application as having the diaphragm control rings engage the diaphragm lamellae at the ends thereof. However, in connection with the present invention it should be emphasized that it may become necessary for reasons of construction to have one or both diaphragm control rings engage the lamellae at another point, instead of at the ends of the lamellae.

The present invention can be applied to all types of camera shutters having a diaphragm, whereby it is merely assumed that parallel extending scales for exposure time, objective diaphragm, and, if desired, exposure value, should be displaceable relative to each other. Thus, the present invention can be applied to all shutters, including slotted shutters, with advantage, but it should be emphasized that the invention is particularly suitable for use in objective shutters, particularly central shutters.

The appended drawing diagrammatically illustrates some specific embodiments of the invention, described and explained hereinafter. The drawing illustrates a central shutter provided with two locking levers according to the invention.

Referring now to the drawings in detail, reference numeral 1 denotes the diaphragm lamellae, of which only is shown in the drawing for the sake of clearness. The lamellae are pivotally connected at point 2 to time adjusting member 3 and at their other end 4 they are connected through a guide slot 5 with the diaphragm adjusting member 6. The diaphragm adjusting member 6 carries a diaphragm scale 7 and the light value scale 8, which latter cooperates with mark 9. The time adjusting member 3 carries double mark 11 for the diaphragm scale 7 and the stationary time scale 10. Arranged on the time adjusting member 3 are two double-armed levers 12 and 13, which are under spring loading and rotatably arranged about shafts 14 and 15, respectively. If, during during turning of the time adjusting member, the double mark 11 moves beyond the diaphragm values "2.8" and "22", over the diaphragm scale, the lugs 16 of the locking levers 12 and 13 move on the peripheral surface 17 of diaphragm adjusting member 6. As long as both levers 12 and 13 slide with their lugs 16 on the peripheral surface of the diaphragm adjusting member 6, the locking noses 18 of the two locking levers 12 and 13 will be out of engagement with the stationary teeth 19 and 20. If, by turning the diaphragm adjusting member 6—for example in dependence on the built-in exposure meter—a definite light value is adjusted, subsequently by turning the time adjusting member 3 a definite time value or a definite diaphragm value can be selected by means of the double mark 11. If, during this selecting step, one of the end values of the diaphragm scale 7 is reached, one of the lever lugs 16 will fall into one of the recesses 21 or 22 provided in the diaphragm adjusting member, whereby the locking nose 18 of the corresponding lever 12 or 13 falls into a step of a series of stationary detents 19 or 20 so that further turning of the time adjusting member in this direction is arrested. Thus, it cannot happen that, due to inadvertent turning of the time adjusting member, the diaphragm adjusting member is also turned so that the respective measured light value is changed. The lug 16 of lever 12 falls into the recess 21 of the diaphragm adjusting member when, during the selection of a time-diaphragm combination corresponding to the light value, the end value "2.8" of the diaphragm scale 7 is reached, whereby the locking nose 18 of lever 12 falls into the stationary detent located under the exposure time 1/30 sec., as shown in the example illustrated in the drawing. If, on the other hand, by turning the time adjusting member for the selection of a time-diaphragm-combination corresponding to the light value, the end value "22" of the diaphragm scale 7 is reached, the lug 16 of lever 13 will fall into recess 22 of the diaphragm adjusting member and nose 18 of lever 13 will be locked in one of the stationary detents 20. The recesses 21 and 22 on the diaphragm adjusting member 6 are designed in such a manner that, at each operation of the diaphragm adjusting member 6, the lug 16 is of the then locked lever 12 or 13 lifted without difficulty from the recess to the peripheral surface of the diaphragm adjusting member 6 so that each new adjustment of the light value over the diaphragm adjusting member automatically renders ineffective the locking action of levers 12 and 13 in combination with the detent rows 19 and 20. This means that, through the diaphragm adjusting member, any measured light value can be adjusted at any time, while by turning the time adjusting member the range of selection of time-diaphragm-combinations corresponding to correct light values is possible only within the predetermined residual diaphragm range in the respective case. Thus, an inadvertent change of the light value by the time adjusting member is not possible.

For particular purposes, e.g. for trick pictures, in which an adjustment not corresponding to the light value may be desired, levers 12 and 13 are provided at one of their ends with means for eliminating the locking effect, for example with a lug which projects from the shutter casing and can be manually operated. Such a lug or projection for eliminating the locking effect is shown in the drawing on lever 12 by reference numeral 23. If this projection is manually depressed, lever 12 will be out of locking engagement, for example as long as projection 23 is depressed.

It will be understood from the above that this invention is not limited to the specific elements, designs, arrangements and other details described above and illustrated in the drawing and can be carried out with various modifications without departing from the scope of the invention as defined in the appended claims.

It will be understood further from the above that the present invention represents an essential improvement of the device described in the above-mentioned copending application Serial No. 520,001, which has been assigned to the same assignee as the present application. Said device comprises, in a preferred embodiment, a shutter and an adjustable diaphragm having adjustable blades. Said shutter and diaphragm are adjustable according to scales which have equal divisions and the sequence of which corresponds to the exponent two and are suitable for adjustment of light values. The diaphragm blades are connected at one end with a first adjusting member which is adjustable according to a stationary scale of the camera and is also provided with a scale of diaphragm values, which has a fixedly defined position relative to a time scale upon adjustment of the light value. The other ends of th diaphragm blades are rendered adjustable by connecting them with a second adjusting member which is capable of being selectively adjusted to diaphragm numbers and time values, respectively, of the shutter, whereby the time-diaphragm-combination corresponding to the adjustment of the light value is preserved and said combination and said light value define the selection range of time and diaphragm values.

What is claimed is:

1. In a photographic camera including a shutter and a diaphragm having movable lamellae: a shutter speed setting means; a diaphragm setting means; said setting means being movable relative to each other and both of said setting means being connected to the lamellae of the diaphragm to conjointly control the adjustment of the diaphragm opening and detent means movably mounted on one of said setting means at a fixed location thereon; stop means fixed relative to the camera and cooperable with said detent means; said detent means being operable by the other setting means and retained thereby out of engagement with said stop means during moving of said shutter speed setting means in either direction relative to said diaphragm setting means, within the range of adjustment of the diaphragm opening; said detent means engaging said stop means to arrest motion of said one setting means at the limit of the range of adjustment of the diaphragm opening in the adjustment direction corresponding to the direction of such relative movement of said shutter speed setting means.

2. In a photographic camera as claimed in claim 1: said detent means and said other setting means being cooperably constructed and arranged so that any operation of said other setting means actuates said detent means to release said one setting means for movement relative to said other setting means.

3. In a photographic camera including a shutter and a diaphragm having movable lamellae: a shutter speed setting means; a diaphragm setting means; said setting means being movable relatively to each other and both of said setting means being connected to the lamellae of the diaphragm to conjointly control the adjustment of the diaphragm opening; a relatively fixed scale member cooperable with said shutter speed setting means; abutment means on said scale member; detent means carried by said shutter speed setting means; and means on said diaphragm setting means cooperable with said detent means and operable, during movement of said shutter speed setting means in either direction relative to said diaphragm setting means, to actuate said detent means to engage said abutment means at the limit of the range of adjustment of the diaphragm opening in the adjustment direction corresponding to the direction of such relative movement of said shutter speed setting means to arrest movement of said shutter speed setting means.

4. In a photographic camera as claimed in claim 3. said detent means and said means on said diaphragm setting means being cooperably constructed and arranged so that said detent means are released from said abutment means by said diaphragm setting means upon any actuation of said diaphragm setting means.

5. In a photographic camera as claimed in claim 3: said detent means comprising levers pivotally mounted on said shutter speed setting means and arranged to be rocked, by said means on said diaphragm setting means, to engage said abutment means.

6. In a photographic camera as claimed in claim 5: spring means biasing said levers to engage said abutment means; said means on said diaphragm setting means restraining movement of said levers, under the spring bias, except at each limit of the range of adjustment of the diaphragm opening.

7. In a photographic camera as claimed in claim 5: said levers being pivoted intermediate their ends on said shutter speed setting means, and each having one end engaging the periphery of said diaphragm setting means and another end arranged to engage said abutment means; the periphery of said diaphragm setting means being formed with recesses into which said one ends of said levers are biased at each limit of the range of adjustment of the diaphragm opening to engage the other ends of the levers with said abutment means.

8. In a photographic camera as claimed in claim 3: a diaphragm scale on said diaphragm setting means; and an indicator on said shutter speed setting means cooperable with said diaphragm scale; said arresting of the motion of said shutter speed setting means occurring when said indicator is opposite either end of said diaphragm scale.

9. In a photographic camera as claimed in claim 3: said setting means and said scale member comprising concentric rings, the shutter speed setting ring being disposed radially between the diaphragm setting ring and said scale member ring.

10. In a photographic camera as claimed in claim 8: said setting means and said scale member constituting concentric rings, with said shutter speed setting ring being disposed radially between said diaphragm setting ring and said scale member ring; said scale member ring being provided with a time scale cooperable with said indicator on said shutter speed setting means.

11. In a photographic camera as claimed in claim 5: manual means operatively associated with said levers and selectively operable to disengage said levers from said abutment means.

12. In a photographic camera as claimed in claim 11: said manual means comprising an outwardly projecting lug on a lever, arranged to be manually actuated.

13. In a photographic camera as claimed in claim 3: one of said setting means being connected to the lamellae at points intermediate the ends of the latter.

References Cited in the file of this patent

UNITED STATES PATENTS

| | | |
|---|---|---|
| 2,351,978 | Kuppenbender | June 20, 1944 |
| 2,467,946 | Rossman et al. | Apr. 19, 1949 |
| 2,509,385 | Ziaylek | May 30, 1950 |
| 2,580,324 | Schwarz | Dec. 25, 1951 |
| 2,829,574 | Gebele | Apr. 8, 1958 |
| 2,891,457 | Schwahn | June 23, 1959 |
| 2,911,897 | Fahl | Nov. 10, 1959 |